US010376783B2

(12) United States Patent
Eichstaedt et al.

(10) Patent No.: US 10,376,783 B2
(45) Date of Patent: Aug. 13, 2019

(54) ONLINE CONTESTS WITH SOCIAL NETWORKS

(71) Applicant: Quotient Technology Inc., Mountain View, CA (US)

(72) Inventors: Matthias Eichstaedt, San Jose, CA (US); Sunil K. Bopardikar, Sunnyvale, CA (US); Deepak Goel, Dehli (IN)

(73) Assignee: Quotient Technology Inc., Mountain View, CA (US)

(*) Notice: Subject to any disclaimer, the term of this patent is extended or adjusted under 35 U.S.C. 154(b) by 0 days.

(21) Appl. No.: 15/372,069

(22) Filed: Dec. 7, 2016

(65) Prior Publication Data

US 2017/0087462 A1 Mar. 30, 2017

Related U.S. Application Data

(63) Continuation of application No. 13/540,339, filed on Jul. 2, 2012, now Pat. No. 9,552,588.

(Continued)

(51) Int. Cl.

*G06Q 30/02* (2012.01)
*G06Q 50/00* (2012.01)

(Continued)

(52) U.S. Cl.

CPC ............ *A63F 13/35* (2014.09); *A63F 13/792* (2014.09); *A63F 13/87* (2014.09);

(Continued)

(58) Field of Classification Search

None

See application file for complete search history.

(56) References Cited

U.S. PATENT DOCUMENTS 5,250,789 A 10/1993 Johnsen
8,328,635 B2 12/2012 Oosthoek (Continued)

FOREIGN PATENT DOCUMENTS

| | | |
|---|---|---|
| KR | 10-2002-0074032 | 9/2002 |
| WO | WO2008/043143 A1 | 4/2008 |
| WO | WO 2010/048540 A1 | 4/2010 |

OTHER PUBLICATIONS

U.S. Appl. No. 13/540,339, filed Jul. 2, 2012, Office Action, dated Oct. 7, 2016.

(Continued)

*Primary Examiner* — Damon J Pierce
(74) *Attorney, Agent, or Firm* — Hickman Palermo Becker Bingham LLP

(57) ABSTRACT

In an embodiment, a method comprises causing, to be displayed to a user through a web page of a social network provider that provides a social network, contest data that indicates an online contest; receiving, at a particular entity, input that indicates an intention by the user to participate in the online contest; sending, from the particular entity, request data that indicates a request, by the particular entity, for one or more permissions that allows the particular entity to access information from the social network provider about the user; after sending the request data, receiving, at the particular entity, acceptance data that indicates that the user accepts the request; in response to receiving the acceptance data, causing the user to be entered in the online contest; wherein the method is performed by one or more computing devices.

22 Claims, 10 Drawing Sheets

Related U.S. Application Data

(60) Provisional application No. 61/513,330, filed on Jul. 29, 2011, provisional application No. 61/513,276, filed on Jul. 29, 2011, provisional application No. 61/513,341, filed on Jul. 29, 2011.

(51) Int. Cl.

| | |
|---|---|
| ***A63F 13/35*** | (2014.01) |
| ***A63F 13/792*** | (2014.01) |
| ***A63F 13/87*** | (2014.01) |
| ***G06F 21/62*** | (2013.01) |
| *H04L 29/06* | (2006.01) |

(52) U.S. Cl.

CPC ..... *G06F 21/6245* (2013.01); *G06Q 30/0209* (2013.01); *G06Q 50/01* (2013.01); *G06Q 30/0277* (2013.01); *H04L 63/10* (2013.01)

(56) References Cited

U.S. PATENT DOCUMENTS

| | | | |
|---|---|---|---|
| 8,663,002 | B2 | 3/2014 | Oosthoek |
| 9,076,303 | B1 | 7/2015 | Park et al. |
| 9,098,841 | B2 | 8/2015 | Evans |
| 9,098,879 | B2 | 8/2015 | Bennett et al. |
| 9,117,228 | B1 | 8/2015 | Akadiri |
| 9,123,057 | B1 | 9/2015 | Kessenger et al. |
| 9,129,305 | B2 | 9/2015 | Larner et al. |
| 9,135,635 | B2 | 9/2015 | Jennings et al. |
| 9,135,639 | B2 | 9/2015 | Abbott |
| 9,143,249 | B2 | 9/2015 | Bova |
| 9,147,196 | B2 | 9/2015 | Hansen et al. |
| 9,147,204 | B2 | 9/2015 | Iqram |
| 9,177,331 | B2 | 11/2015 | Fisher et al. |
| 2002/0042739 | A1 | 4/2002 | Srinivasan et al. |
| 2002/0065713 | A1 | 5/2002 | Faisal et al. |
| 2002/0198843 | A1 | 12/2002 | Wang et al. |
| 2004/0236607 | A1 | 11/2004 | Kost et al. |
| 2005/0216300 | A1 | 9/2005 | Appleman et al. |
| 2006/0212355 | A1 | 9/2006 | Teague et al. |
| 2008/0064492 | A1 | 3/2008 | Oosthoek |
| 2008/0133336 | A1 | 6/2008 | Altman et al. |
| 2008/0275767 | A1 | 11/2008 | Rafie |
| 2009/0024477 | A1 | 1/2009 | Kramer et al. |
| 2009/0076912 | A1 | 3/2009 | Rajan et al. |
| 2009/0287558 | A1 | 11/2009 | Seth |
| 2010/0094940 | A1 | 4/2010 | Tsai et al. |
| 2010/0125490 | A1 | 5/2010 | Kiciman |
| 2010/0185504 | A1 | 7/2010 | Rajan et al. |
| 2010/0228617 | A1 | 9/2010 | Ransom et al. |
| 2011/0023101 | A1 | 1/2011 | Vernal et al. |
| 2011/0106600 | A1 | 5/2011 | Malik et al. |
| 2012/0071235 | A1 | 3/2012 | Walker et al. |
| 2012/0089447 | A1 | 4/2012 | Listermann |
| 2013/0030895 | A1 | 1/2013 | Eichstaedt et al. |
| 2013/0030901 | A1 | 1/2013 | Eichstaedt et al. |
| 2013/0102385 | A1 | 4/2013 | Oosthoek |

OTHER PUBLICATIONS

U.S. Appl. No. 13/540,339, filed Jul. 2, 2012, Office Action, dated Jan. 9, 2015.

U.S. Appl. No. 13/540,339, filed Jul. 2, 2012, Interview Summary, dated Dec. 21, 2015, U.S. Appl. No. 13/540,339, filed Jul. 2, 2012, Office Action, dated Sep. 15, 2015.

U.S. Appl. No. 13/540,339, filed Jul. 2, 2012, Notice of Allowance, dated Sep. 7, 2016.

U.S. Appl. No. 13/540,339, filed Jul. 2, 2012, Final Office Action, dated May 26, 2015.

U.S. Appl. No. 13/540,339, filed Jul. 2, 2012, Final Office Action, dated Apr. 6, 2016.

U.S. Appl. No. 13/540,339, filed Jul. 2, 2012, Interview Summary, dated May 17, 2016.

U.S. Appl. No. 13/540,339, filed Dec. 12, 2013, Final Office Action, dated Dec. 12, 2013, U.S. Appl. No. 13/540,339, filed Jul. 2, 2102, Restriction Requirement, dated Aug. 13, 2013.

U.S. Appl. No. 13/540,339, filed Jul. 2, 2012, Office Action, dated Oct. 7, 2013.

Van Grove. "Twitter to Facebook: 5 Ways to Post to Both", Mashable, May 25, 2009, found online at masahble.com/2009/05/25/twitter-to-facebook/ (11 pages).

Korean Intellectual Property Office, Search Report and Written Opinion, application No. PCT/US2012/048126, dated Feb. 15, 2013, 10 pages.

Korean Intellectual Property Office, Search Report and Written Opinion, application No. PCT/US2012/048107, dated Feb. 15, 2013, 10 pages.

European Patent Office, "Search Report" in application No. 12819691.2-1958, dated Dec. 22, 2014, 7 pages.

European Claims in application No. 12819691.2-1958, dated Dec. 2014, 6 pages.

Berners-Lee et al., Hypertext Transfer Protocol-HTTP/1.0, Network Wokring Group Request for Comments #1945, dated May 1996, online at ieft.org, 57 pages.

Korean Intellectual Property Office, Search Report and Written Opinion, application No. PCT/US2012/048048, dated Feb. 13, 2013, 9 pages.

Canada Patent Office, "Search Report" in application No. 2,843,327, dated Apr. 16, 2018, 4 pages.

Canada Claims in application No. 2,843,327, dated Apr. 2018, 6 pages.

FIG. 3A
facebook
SAVE BETTER
Coupons.com · Sweepstakes
Like
THE MORE THE MERRIER
Like us and
Enter for a chance to win an HP
Coupons.com app-enabled printer!
10K likes
30K likes
20K likes
For every new 10,000 likes,
we will give away one printer!
67,727

PAGE 310

PORTION 312

PAGE 320

PORTION 322

FIG. 3C
facebook
Coupons.com - Sweepstakes
THE MORE, THE MERRIER
Enter for a chance to win an HP Coupons.com app-enabled printer!
we will give away one printer!
SAVE BETTER
67,727

PAGE 330

PORTION 332

FIG. 3E
facebook
Coupons.com · Sweepstakes
THE MORE, THE MERRIER
Like
SAVE BETTER
67,727

PAGE 350

PORTION 352

FIG. 3F
Preview Sweepstakes Invitation
To:
Juliana Chea ×
Add Personal Message
Preview:
You have a Sweepstakes invitation.
Andrés Suay Mas
Andrés wants to invite you to join the Coupons.com Sweepstakes for the chance to win an HP® e-all-in-one printer! Enter now for your chance to win!
from Coupons.com
Accept
Ignore
Send
Cancel

MESSAGE 360

ONLINE CONTESTS WITH SOCIAL NETWORKS

BENEFIT CLAIM; CROSS-REFERENCE TO RELATED APPLICATIONS

This application is a continuation of, and claims the benefit of, U.S. application Ser. No. 13/540,339, filed Jul. 2, 2012, which claims the benefit of U.S. Provisional Application Nos. 61/513,330, 61/513,276, and 61/513,341, each filed Jul. 29, 2011, all of which are incorporated herein by reference as if fully disclosed herein.

This application is related to U.S. Pat. No. 8,694,367 B2, entitled, "Coupons Social Networking Platform," filed Nov. 2, 2011 and to U.S. Pat. No. 8,768,761, entitled, "Unlocking Coupon Offers" filed Mar. 20, 2012, the entire contents of which is hereby incorporated by reference as if fully set forth herein.

TECHNICAL FIELD

Embodiments relate generally to online contests and, more particularly, to providing a computer system for multiple online contest providers to host online contests.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many types of contests exist that involve prizes as awards to certain contestants. Sweepstakes and lotteries are examples of such contests. Different contests have different requirements regarding who can enter the contests and different criteria regarding which contestants will be selected to win a prize. Such differences may be attributed to the type of contest and/or the specific contest in question.

One drawback to current contests, such as lotteries, is that participation is limited due to the fact that a marketer of a contest needs to reach each potential participant individually. Advertising contests through billboards, television, newspapers, radio, and the Web have proven to be difficult in terms of achieving a significant amount of participation when considering the costs of the advertising.

SUMMARY OF THE INVENTION

The appended claims may serve to summarize the invention.

DETAILED DESCRIPTION

Figure 1:
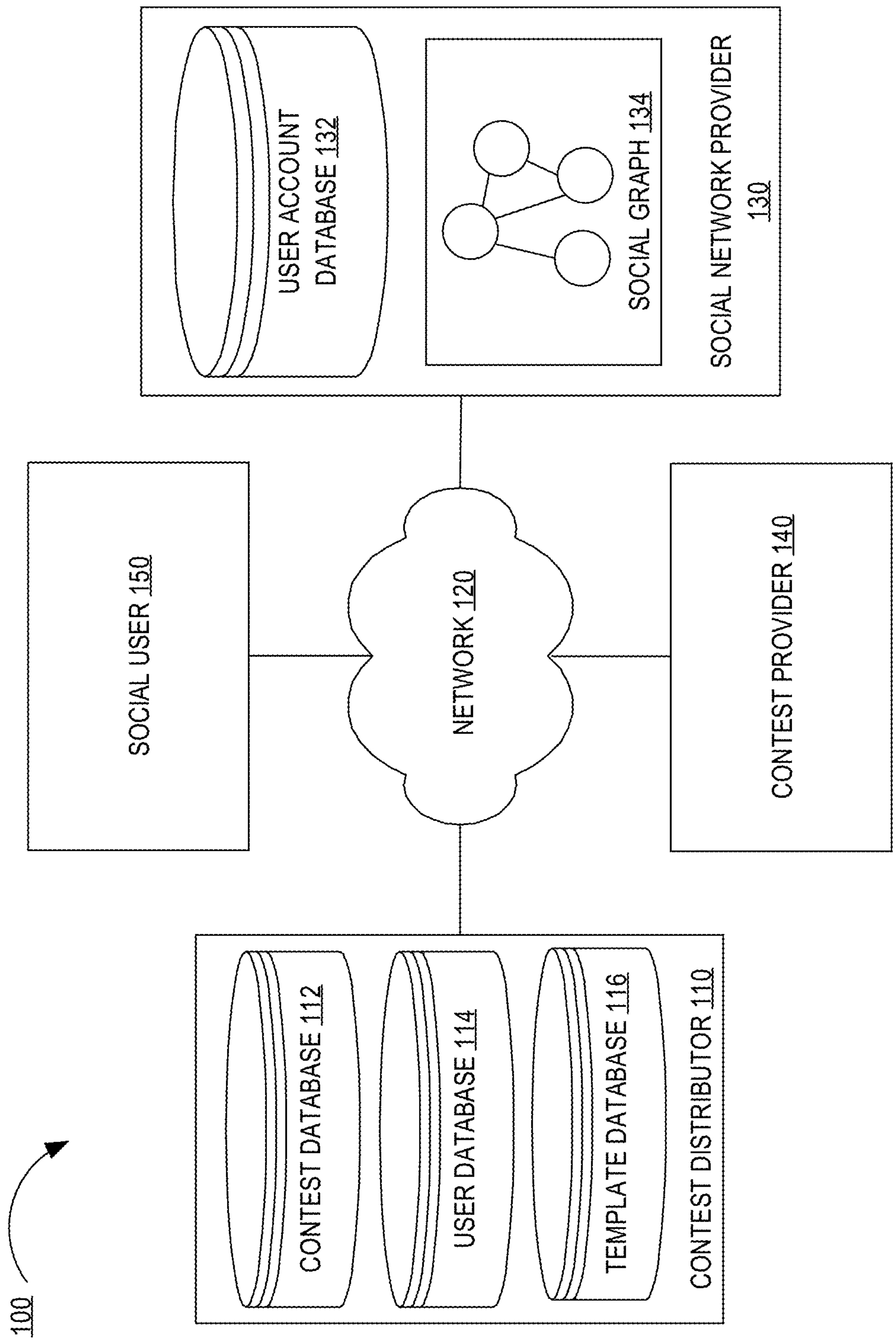
FIG. 1 illustrates an example computer system architecture for managing one or more online contests.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Architectural Overview
3.0. Entering An Online Contest
  3.1 "Liking" An Item
  3.2 Determine Whether To Enter The User In The Contest
    3.2.1 "Like" Check
    3.2.2 Contest Check
    3.2.3 Entrance Check
    3.2.4 Changes to a Check
  3.3 Contest Rules
  3.4 Request For Permission
  3.5 Contest Entrance
  3.6 Social Notification Message
    3.6.1 Message Templates
  3.7 Friend Selection
4.0. Display Sequence
5.0. Creating Content For Online Contests
6.0. Selecting A Winner Of An Online Contest
7.0. Distributor Using User Data To Distribute Online Contests
8.0. Implementation Mechanism—Hardware Overview
9.0. Extensions and Alternatives

1.0. General Overview

Social networking services, such as Facebook and Google+, provide environments for sharing information with friends. Messages initiated by one registered user and sent to friends or contacts of the user may include a status update, a current location, a picture, a reminder, or general tips and opinions. Information in which many registered users of a social network provider are interested can travel through the corresponding social network very rapidly and reach a substantial audience.

In an embodiment, a computer system makes an online contest (of which examples include sweepstakes, lotteries, prize drawings) available as a node in a social graph that is maintained by a social network service provider (or simply, "social network provider"). Initially, the contest node is "locked" with respect to a social network user who attempts to enter the corresponding online contest. In this context, "locked" means that specified information about the contest node may be displayed, but the social network user is not capable of entering the contest or performing contest functions. The registered user of the social network provider can enter the online contest only when the user initiates the linking of the user's profile node with the contest node. Establishing a link between the node of a social user and a contest node allows the individual to be entered in the online contest.

In an embodiment, in response to a user entering an online contest, a message is propagated into the user's activity stream, such that the user's friends in the social network are notified of the online contest, of the provider of the contest, or of a product/service provided by the provider of the contest. In this way, entering an online contest by one social user promotes the viral distribution of the online contest or an associated advertisement, offer, item, or brand.

For example, in the context of the Facebook environment, an online contest can be represented as an Open-Graph node with basic metadata about contest (description, brand, duration, restrictions). If a user desires to enter the online contest, then the user first indicates that the user "likes" the online contest. By "liking" the online contest (or associated item or brand) and entering the online contest as a result, a message (for example, "Mark just entered the Free Printer 2000× Sweepstakes") is automatically communicated to the user's friends.

2.0. Architectural Overview

FIG. 1 illustrates an example computer system architecture 100 for managing one or more online contests. In an embodiment, system architecture 100 includes contest distributor 110, network 120, social network provider 130, contest provider 140, and social user 150. One or more networked computers may implement each of the elements of FIG. 1. Thus, each of multiple elements of FIG. 1 (such as contest distributor 110 and social network provider 130) may be implemented by a different sophisticated computer system. In contrast, each of multiple elements of FIG. 1 (such as contest provider 140 and social user 150) may be implemented by a different single electronic device.

In an alternative embodiment, computer system architecture 100 does not include contest distributor 110 or a contest distributor computer. Thus, in this embodiment, contest provider 140 does not rely on another entity (like contest distributor 110) to distribute and manage one or more online contests that contest provider 140 provides.

In an embodiment, contest distributor 110 includes one or more computing devices and one or more storage devices that store data regarding online contests of one or more contest providers and data regarding users of one or more social network providers. In the example of FIG. 1, contest distributor 110 includes a contest database 112, a user database 114, and a template database 116, each of which is described in more detail below. Each of databases 112-116 may be part of the same storage device or may be part of separate storage devices.

In an embodiment, the logic, configuration or programs hosted in contest distributor 110 allows online contests to be accessible to users of social network provider 130, causes new contest nodes to be introduced into a social graph of social network provider 130, allows a user of social network provider 130 to link his/her node to a contest node in the social graph, and gathers and stores information about users of social network provider 130 (and, optionally, of other social network providers, not shown).

The functionality of contest distributor 110 and contest provider 140 may be implemented using stored program logic in one or more special-purpose computers or loaded from one or more non-transitory media into the memory of one or more general-purpose computer and then executed.

Communication between various entities depicted in FIG. 1 may be made over a network 120. Network 120 may be implemented by any medium or mechanism that provides for the exchange of data between various entities communicatively coupled to network 120. Examples of network 120 include, without limitation, a network such as a Local Area Network (LAN), Wide Area Network (WAN), Ethernet or the Internet, or one or more terrestrial, satellite, or wireless links. Network 120 may include a combination of networks such as those described. Network 120 may transmit data according to Transmission Control Protocol (TCP), User Datagram Protocol (UDP), and/or Internet Protocol (IP).

Social network provider 130 provides a social networking service. Examples of social network providers include Facebook, Google+, Twitter, and Hi5. Social network provider 130 includes one or more computing devices and one or more storage devices that store data (for example, in user account database 132) regarding one or more users that are registered with the service, and connections between users and between users and content. Users may be individuals or organizations, such as business entities. The connections between users and between users and content items may be viewed as a social graph, such as social graph 134.

Although only a single social network provider 130 is depicted in FIG. 1, system architecture 100 may include multiple social network providers with which contest distributor 110 interacts in order to distribute online contests and, in one embodiment, target messages to users that are registered with the various social network providers.

Contest provider 140 is a business entity that manufactures a product or represents a brand and initiates one or more online contests (or authorizes a third-party, such as contest distributor 110, to run the one or more online contests on its behalf) to encourage awareness of a brand, product, or service associated with the online contest(s). In an embodiment, contest provider 140 communicates contest data to contest distributor 110 over network 120. The contest data includes information about one or more online contests managed by contest distributor 110. Contest distributor 110 is responsible for acting on behalf of contest provider 140 to distribute and manage online contests reflected in the contest data to potential contestants.

Although only a single contest provider 140 is depicted in FIG. 1, computer system architecture 100 may include numerous contest providers, each of which is registered with social network provider 130 and contracts with contest distributor 110 to manage or run their respective online contests. Thus, contest database 112 may include contest data for multiple online contests (both active and inactive) from multiple contest providers.

Social user 150 is any potential customer that is registered with social network provider 130. Social user 150 may use one or multiple computing devices to access a social network service provided by social network provider 130. Examples of computing devices that a social user may use to access the social network service and enter an online contest include a desktop computer, a laptop computer, a tablet computer, and a smartphone.

Although only a single social user 150 is depicted in FIG. 1, system architecture 100 may include numerous social users, each of which is registered with social network provider 130. Thus, user database 114 may include user data for multiple users of social network provider 130 and multiple users of other social network providers (not depicted).

3.0. Entering an Online Contest

Figure 2:
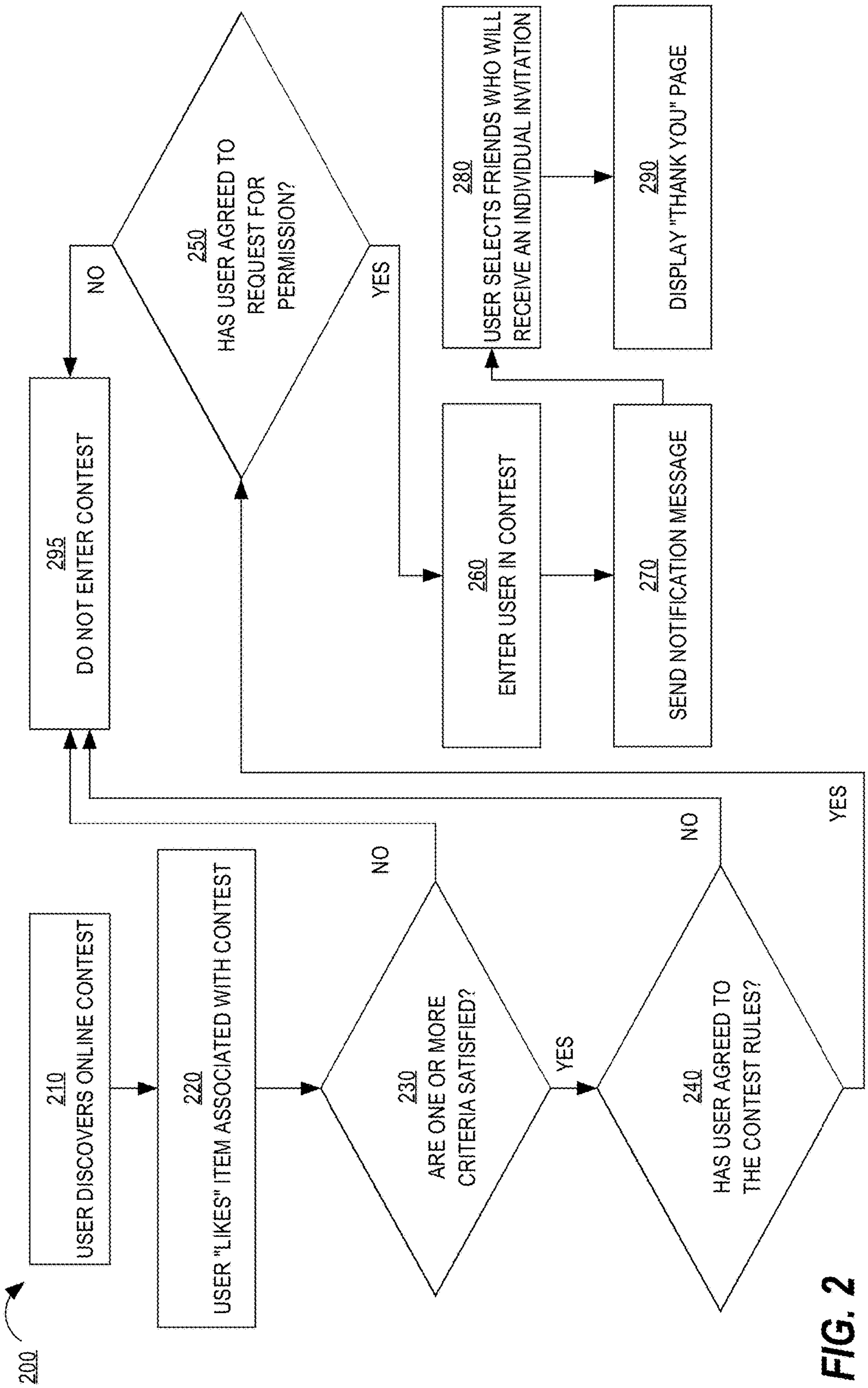
FIG. 2 illustrates an example process for entering an online contest.

FIG. 2 illustrates an example process 200 for entering an online contest. At block 210, social user 150 discovers an online contest. Using a device, social user 150 may discover the online contest through one of numerous possible locations. For example, social user 150 may discover the online contest on a web page provided by contest distributor 110 (such as Coupons.com), on a web page provided by contest provider 140 (such as Gamma Mills), on a "fan" page (for contest provider 140) that is hosted by social network provider 130, on a search results page provided by a search engine, or on a web page that is an hosted by an affiliate of contest distributor 110 or of contest provider 140. Alternatively, information about the online contest may be displayed as an advertisement provided through a third-party mobile application (for example, a music application) executing on a device (for example, a "smart" phone) of social user 150.

At block 210, the online contest is in a "locked" state. In this context, "locked" means the user is unable to enter the online contest. The user is required to perform one or more actions in order to be entered into the online contest. Unless those one or more actions are performed, the user cannot enter the online contest. Entering an online contest may involve contest provider 140 or contest distributor 110 (*a*) storing data that associates (1) identification data that identifies social user 150 with (2) the online contest or (b) providing, to social user 150, a contest entrance code that social user 150 may use later to enter the online contest or retrieve a prize offered by contest provider 140.

3.1 "Liking" an Item

At block 220, social user 150 provides input in an attempt to enter the online contest. The input may be received by contest distributor 110 or contest provider 140. Although blocks 220-295 are described as being performed by contest distributor 110, other embodiments involve contest provider 140 performing blocks 220-295 or contest distributor 110 performing some of blocks 220-295 and contest provider 140 performing other of blocks 220-295.

In an embodiment, block 220 involves social user 150 selecting social network data that is displayed concurrently and adjacent to information about the online contest. The social network data may be any selectable data item (such as a graphical button) that is associated with social network provider 130. For example, if social network provider 130 is Google, then the button may be a "+1" button. As another example, if social network provider 130 is Facebook, then the button may be a "Like" or "Recommend" button. The button may be implemented using an iFrame or JavaScript in HTML of a web page that includes information about the online contest.

The input that is received as a result of a user's action at block 220 is referred to herein as "liking" an item. "Liking" an item may involve a user clicking or otherwise selecting a graphical data item that is associated with a particular social network provider. When a user selects the data item, the user effectively agrees to the terms (dictated by the social network provider) that are associated with performing that action. The terms associated with liking an item may involve having the social user's node, in the social network, linked with a node associated with the entity that provides the item (or, in this example, initiates the online contest). For example, social user 150 is registered with social network provider 130 and selects a button that is associated with social network provider 130 and that is displayed concurrently with online contest for Beta batteries. Selecting the button indicates the willingness on the part of social user 150 to have his/her profile linked with a profile for Beta batteries. Being willing to link one's node to another node typically entails also being willing to have one's friends in the social network notified about the linking. In other words, the terms associated with liking an item may also involve allowing friends of the user (that selected the icon) to see that the user "liked" the item. Thus, friends of the user that "liked" particular content may be notified, by the social network provider, with a message indicating that the user "liked" that particular content.

In an embodiment where social network provider 130 is not involved, then block 220 may involve user 150 "signing in" to contest distributor 110. In other words, user 150 providing user credential data (for example, a user name and password) to contest distributor 110 may be a condition for entering an online contest. Until user 150 provides user credential information and contest distributor 110 verifies user 150 based on the user credential information and authorizes user 150 to enter an online contest, that online contest remains "locked" with respect to user 150.

3.2 Determine Whether to Enter the User in the Contest

At block 230, contest distributor 110 determines, based on one or criteria, whether to enter the user in an online contest. Thus, in this embodiment, a user is not immediately entered into an online contest upon detecting that the user "liked" the online contest (or content associated with the online contest). The determination may involve one or more "checks." The following describes three example checks: a "like" check, a contest check, and an entrance check. Although the following description indicates that each of these checks is performed, contest distributor 110 may instead perform zero or more of the checks.

3.2.1 "Like" Check

At block 230, it is determined whether social user 150 has already "liked" the online contest. If a user has already liked the online contest (which indicates that the user has already entered the online contest), then contest distributor 110 may want to prevent the user from entering the online contest again. In other words, the terms of an online contest may indicate that any particular user is only allowed to "like" or enter an online contest once. The determination of whether social user 150 already "liked" the online contest may be performed by contest distributor 110. The determination is based on data sent from the user's device.

As a result of liking the online contest at block 220, the device of social user 150 sends a "like" message to contest distributor 110. (In an embodiment where contest distributor 110 is not involved, the device of social user 150 sends the like message to contest provider 140 or an affiliate of contest provider 140.) For example, selecting a "Like" or "+1" button causes code in a web page that includes the button to execute. Execution of the code causes a like message to be generated and transmitted from social user 150's device to contest distributor 110. The like message includes contest data and social user data. The contest data may identify the specific online contest (for example, a contest identifier), a product associated with the online contest (for example, "Beta AAA Rechargeable Batteries"), or the brand of such a product (for example, "Beta Batteries"). The social user data is data that identifies social user 150 to social network provider 130. For example, the social user data may include a user name and password that is used to authenticate social user 150 to social network provider 130.

If social user 150 is not registered with (or logged into) social network provider 130 at the time that social user 150 "likes" the online contest, then social user 150 is prompted to so register (or log in). After registering or logging in, social user data is sent to contest distributor 110.

In response to receiving the like message from social user 150's device, contest distributor 110 generates and sends, to social network provider 130, a verification message that includes data that is based on the contest data and social user data received from social user 150's device. For example, the verification message may include the same social user data and the same contest data. As another example, the verification message may include contest data that is different than the contest data indicated in the like message from social user 150's device.

Social network provider 130 uses the verification message to determine whether social user 150 already "liked" the online contest previously. For example, social network provider 130 may use the social user data included in the verification message to determine whether social user 150 is registered with social network provider 130 and, if so, uses the contest data included in the verification message to determine whether social user 150 is already linked with a node that corresponds to the online contest.

Social network provider 130 sends, to contest distributor 110, result data that indicates whether social user 150 has previously "liked" the online contest (or the product or brand associated with the online contest). If so, then process 200 proceeds to block 295 where social user 150 is not entered in the online contest. (Block 295 may involve presenting social user 150 with a display message that indicates that social user 150 has already successfully entered the online contest.) In other words, contest distributor 110 will not enter social user 150 in the online contest. If this is the first time social user 150 has "liked" the online contest, then process 200 may proceed to block 240, with or without performing the following two checks.

In an embodiment where social network provider 130 is not involved, then the like check is not performed.

3.2.2 Contest Check

As noted previously, another possible check at block 230 is the "contest check." The contest check may be performed by contest distributor 110. The contest check involves determining whether one or more attributes of the online contest satisfy certain criteria. For example, the contest check may involve determining whether the time for entering the online contest has ended. As another example, the contest check may involve determining whether prizes or rewards of the online contest have already been distributed to the contest winner(s).

As another example, prior an online contest being distributed, contest provider 140 may determine that only 1000 users should be able to be entered into the online contest. If social user 150 "likes" the online contest (or, for example, the associated brand) and 1000 users have already been entered into the online contest, then social user 150 is not entered in the online contest (along with other users that attempt to thereafter enter the online contest). In this example, a contest's "inventory" refers to the number of remaining users that may be able to enter the online contest. Alternatively, a contest's "inventory" may refer to the number of users that have already entered the online contest.

If contest distributor 110 is responsible for distributing the online contest on behalf of contest provider 140, then contest distributor 110 may store data that indicates a current status of the online contest. Thus, checking whether there is sufficient inventory associated with the online contest (and/or whether the contest is still pending) may involve contest distributor 110 checking a locally stored value. Alternatively, contest provider 140 may maintain an "inventory value" that indicates a current inventory associated with the online contest. In this case, contest distributor 110 may send, over network 120 to contest provider 140, a request for the current inventory level or simply for an indication of whether there is sufficient inventory available. Based on a response from contest provider 140, contest distributor 110 determines whether there is sufficient inventory to allow social user 150 to enter the online contest.

3.2.3 Entrance Check

As noted previously, another possible check at block 230 is the "entrance check." The entrance check involves determining whether social user 150 has reached a certain limit in terms of the number of times social user 150 has entered the online contest. For some online contests, any user is only allowed to enter the online contest once. For other online contests, the limit may be higher. An entrance check may be performed by contest distributor 110 or contest provider 140.

An entrance check may initially involve determining whether a particular plug-in is installed on social user 150's device. The particular plug-in may be an ActiveX plug-in to a web browser. An example of the particular plug-in is described in U.S. patent application Ser. No. 12/274,348, filed Nov. 19, 2008 and is incorporated herein by reference as if fully set forth herein.

If the user's device has not yet installed the particular plug-in, then, in an embodiment, the plug-in is installed before the user is allowed to enter the online contest. Thus, after a user "likes" an online contest and contest distributor 110 discovers that the user's device does not have the plug-in installed, contest distributor 110 may prompt the user to install the plug-in. Once installed, the plug-in (1) identifies one or more attributes of the user's device, (2) generates, based on the one or more attributes, signature data that identifies the user's device, and (3) sends, over a network, the signature data to contest distributor 110. Once the plug-in is installed and sends signature data to the appropriate entity, that entity determines, based on the signature data, whether social user 150 has entered the online contest previously or, optionally, determines a number of times social user 150 entered the online contest. In order to make this determination, contest distributor 110 may access a database of signatures, each of which is associated with history data that indicates one or more online contests for which the plug-in previously requested information. From the history data associated with the signature data that identifies social user 150's device, it is determined whether social user 150 has reached a limit with respect to the online contest.

In some situations, the plug-in may have been previously installed on social user 150's device but, at the time of process 200, the plug-in may not be installed on social user 150's device. This may happen if social user 150 intentionally uninstalls the plug-in in order to attempt to enter the online contest again in violation of the terms of the online contest (that may indicate only one entry per user). This also may happen if the plug-in was unintentionally uninstalled. Regardless of the reason(s) for uninstalling the plug-in, re-installing and running the plug-in would cause the plug-in to generate the same signature data that the previously-installed plug-in generated prior to the un-installation. Thus, contest distributor 110 can know if the user previously entered an online contest from the same user device.

An entrance check may be performed in addition to a "like" check because social user 150 may have "liked" the online contest previously using one social network provider and then attempts to "like" the online contest again using a different social network provider. Thus, performing an entrance check prevents a user, using the same device, from entering the same online contest using different social network providers.

If it is determined that social user 150 has exceeded his/her limit with respect to entering the online contest, then process 200 proceeds to block 295, where social user 150 is not entered in the online contest. Otherwise, process 200 proceeds to block 240.

3.2.4 Changes to a Check

In an embodiment, one or more changes may occur that affect whether or when a check is performed during the pendency of the online contest. For example, one or more criteria may be used to determine whether, for a particular online contest, the three "checks" described previously (i.e., the "like" check, the contest check, and the entrance check) are implemented. As an example regarding the "like" check, at a first point in time, the "like" check is performed for any particular user that attempts to enter an online contest. Later, at a second point in time, contest provider 140 may decide to have that "like" check removed, thus allowing a user to "like" an online contest multiple times. Thus, a social user that is not able to like the online contest at the first point in time due to the "like" check is able to like the online contest at the second point in time.

As an example regarding the contest check, at a first point in time, the number of prizes award for an online contest is such that no additional users are allowed to enter the online contest. For example, contest provider 140 may have originally only wanted to allow 800 users to enter an online contest. Later, at a second point in time, the "inventory" associated with the online contest increases. For example, contest provider 140 may determine that it would like 1000 users to be able to enter the online contest. The change in inventory may occur (1) prior to the inventory decreasing to a point where one or more users would be denied entrance to the online contest due to the contest check or (b) after one or more users are denied entrance to the online contest due to the contest check.

As an example regarding the entrance check, at a first point in time, the policy associated with an online contest may be that a user may enter the online contest only once. Later, at a second point in time, contest provider 140 may determine to increase that limit to two. Thus, social user 150 may have been denied access to an online contest at the first point in time but, due to the change in the entrance limit, may then be able to enter the online contest again (or have his/her name entered again) at the second point in time.

3.3 Contest Rules

At block 240, it is determined whether social user 150 has agreed to the rules of the online contest. Block 240 may involve contest distributor 110 causing the rules (or a link to the rules) to be displayed to social user 150 to allow social user 150 to read the rules and accept them. Once accepted, process 200 proceeds to block 250.

For online contests that do not have rules that require a user to accept, block 240 is not part of process 200.

3.4 Request for Permission

At block 250, it is determined whether social user 150 has agreed to a request for permission. The request for permission is a request to allow contest distributor 110 to access information about social user 150 from social network provider 130. Social network provider 130 maintains such information, which might include the age (or age range), gender, job or occupational information, education information, geographical information (for example, an address or zip code), and/or one or more interests of social user 150. The request may be unlimited in terms of scope and/or time. For example, once social user 150 agrees to the request, contest distributor 110 may always access information that is about social user 150 and that is maintained by social network provider 130, as long as social user 150 is registered with social network provider 130. Alternatively, the request may be limited in time and/or scope. For example, contest distributor 110 may only be authorized to access information about social user 150 from social network provider 130 for a certain period of time (for example, one month).

Block 250 may involve contest distributor 110 causing the request for permission to be displayed to social user 150 to allow social user 150 to read and accept the request. Once accepted, process 200 proceeds to block 260.

For online contests that do not involve a social network provider or do not demand such a request, block 250 is not part of process 200.

In an embodiment, block 250 is unnecessary if social user 150 has already agreed to a request for permission that was presented to social user 150 immediately before social user 150 entered a prior online contest (whether provided by contest provider 140 or from a different contest provider 140) and contest distributor 110 is still authorized to access the requested information from social network provider 130. Thus, after social user 150 accepts the request for permission for a first online contest (whether or not contest distributor 110 is involved), block 250 may be skipped for each subsequent online contest managed by the same entity (for example, contest distributor 110 or contest provider 140) that manages or runs the first online contest.

The process of authorizing contest distributor 110 access to profile data of a user of social network provider 130 may be referred to as "installing" an application in association with contest distributor 110. "Installing" an application may include social network provider 130 storing data that associates the contest distributor 110 with the user that agreed to the request for permission to provide personal information in exchange for entering the online contest. Thereafter, contest distributor 110 is allowed access, by social network provider 130, to certain profile information of the user, such as gender, age, residence, and interests. In an embodiment, contest distributor 110 uses an API of social network provider 130 to issue one or more calls to social network provider 130 in order to retrieve profile information of the user and store the information in user database 114. The one or more calls may include an identifier for contest distributor 110, an identifier for a particular user, and a unique code that indicates that contest distributor 110 is allowed access to at least a portion of the profile information of the particular user.

After "installing" the application once, the next time social user 150 desires to enter an online contest distributed by contest distributor 110, the user is not required to install the application again, regardless of whether the online contest is from the same contest provider as the prior online contest or from a different contest provider. This is so because the user has already installed the application. The application can access private information of the user and, according to an embodiment, send messages to the user at any time after the user's installation. Therefore, the user may be required to install the application only once.

In an embodiment, block 250 involves social user 150 providing additional information (such as email or other contact information) that contest distributor 110 can use to send messages to social user 150 in the future. Such messages might include information about other online contests in which social user 150 might be interested.

3.5 Contest Entrance

At block 260, social user 150 enters the online contest. "Entering" an online contest may involve contest distributor 110 storing user identification data that uniquely identifies social user 150 (for example, an identifier used by social network provider 130 to identify social user 150) and associating the identification data with contest identification data that identifies the online contest. Thus, if contest distributor 110 is managing multiple online contests for one or more contest providers, then contest distributor 110 may store (1) a first set of user identifiers in association with first contest identification data that identifies a first online contest and (2) a second set of user identifiers in association with second contest identification that identifies a second online contest that is different than the first online contest. Such association data may be stored in user database 114 and/or contest database 112.

In an embodiment where a social network is not involved, user identification data for user 150 may be an identifier generated by contest distributor 110 and may be associated with a username and password associated with user 150. Thus, user 150 may have previously registered and established the username and password with contest distributor 110 prior to attempting to enter an online contest.

In an embodiment, additional data may be stored in association with user identification data. Examples of such additional data include the time of day and/or the date on which the corresponding user entered the corresponding online contest and information (about each contestant) retrieved from social network provider 130 (in scenarios where a social network provider is involved). Such additional data may be stored in user database 114.

In an embodiment, block 260 involves contest distributor 110 providing social user 150 with certain data. The data may be evidence of social user 150 entering the online contest. Social user 150 may use the data to retrieve a prize if social user 150 is a winner of the online contest (which may have multiple winners). Embodiments are not limited to how the data is provided to social user 150. For example, the data may be displayed to social user 150 upon social user 150 entering the online contest. As other examples, the data may be included in an email sent to an email account of social user 150 or may be included in a text message sent to a mobile device of social user 150.

After block 260, process 200 may end or proceed to block 270, block 280, or block 290.

3.6 Social Notification Message

At block 270, contest distributor 110 causes a social notification message to be sent "friends" of social user 150. Block 270 may involve contest distributor 110 sending, in response to determining to enter social user 150 in the online contest, a link message to social network provider 130.

In an embodiment, contest distributor 110 uses APIs provided by social network provider 130 to send the link message to social network provider 130. In addition to sending a link message, the APIs may allow contest distributor 110 to perform one or more other operations, examples of which may include the following: cause a message to be posted to a "wall" or page (hosted by social network provider 130) of social user 150, access information (i.e., maintained by social network provider 130) of social user 150 (for example, gender, age, residence, hobbies), update status messages associated with social user 150, and upload digital media (for example, images) to social user 150's account. For example, for Facebook, the APIs are known as Facebook Graph APIs.

In a related embodiment, instead of contest distributor 110, social user 150's device sends the link message to social network provider 130 using an API of social network provider 130.

The link message includes social user data that identifies social user 150 and contest data that indicates one or more details about the online contest. For example, the contest data may include a name of the online contest, the duration of the online contest, prize data that indicates a prize for the winner(s) of the online contest, product data that identifies a product associated with the online contest, and/or brand data that identifies the brand of the product. The link message may also include one or more images of the product and/or brand. The link message may also include a link (such as a URL) to a web page where the online contest may be viewed and, optionally, entered, for example, through a similar process that social user 150 went through in order to enter the online contest.

In response to receiving the link message (whether from contest distributor 110 or from contest provider 140), social network provider 130 uses the social user data that identifies social user 150 to identify, within user account database 132, "friends" (or contacts) of social user 150. Social network provider 130 sends a social notification message to each identified friend (subject to any restrictions associated with any of the identified friends. For example, some friends may not want to be notified of social user 150's activities and posts). The social notification message indicates that social user 150 is now "linked" with the online contest, the product associated with the online contest, and/or the brand of the product. For example, the social notification message may indicate that social user 150 "likes" the online contest or likes the product/service associated with the online contest. If the social notification message includes a link to the online contest, then, if friends start linking to the online contest, the online contest may quickly "go viral." In this way, many potential customers will be notified of the online contest, many may enter the online contest, and many may be interested in purchasing a product or service provided by contest provider 140.

In an embodiment where a social network provider is not involved, block 270 is not entered.

After block 270, process 200 may end or proceed to block 280 or block 290.

3.6.1 Message Templates

In an embodiment, the social notification message conforms to a particular message template. The message template to which a social notification message conforms may be selected, by a contest provider (for example, contest provider 140), from among multiple message templates. For example, contest distributor 110 may provide, via a web service, multiple message templates to contest provider 140 (and other contest providers, not shown). A contest provider is allowed to access and select one of the available message templates that the contest provider would like to (a) populate with content and (b) have sent to friends of users that enter online contest(s) that originate from the contest provider. The message templates dictate what content is to be included in a social notification message that friends of a user that enters an online contest will receive. The content provided by a contest provider may include text, one or more images, graphics, audio, and/or one or more link. Additionally, the message templates may dictate how the content is to be displayed. For example, one message template may dictate that text is to appear above an image, that a link is to appear below the image, and that the image is to be of a certain shape. Another message template may dictate that text is to appear below an image and that the text itself includes a link.

After contest provider 140 selects a message template and provides content to be included in the selected message template, contest distributor 110 stores the selected template and content in a database and associates the selected template and content with contest provider 140. Additionally, contest distributor 110 may store data that associates a specific online contest with the selected template and content.

Later, in response to determining that social user 150 successfully past any checks (such as a "like" check and an entrance check) associated with an online contest initiated by contest provider 140, contest distributor 110 identifies a message template and content.

The identification of the message template and content may be based on identification data received in a message from the device of social user 150. The identification data may identify the online contest (for example, a unique contest identifier assigned by contest distributor 110) or may identify the entity that provides the online contest.

Additional criteria that may be used to identify the message template and/or content include user behavior, time of day, attributes of the message received from the device of social user 150, etc. For example, contest distributor 110 may maintain one message template for an online contest for relatively "active" users (i.e., ones that enter relatively many online contests) and another message template for the particular online contest for "non-active" users (i.e., ones that enter relatively few or no online contests). As another example, contest distributor 110 may maintain one set of content for a particular online contest that may be entered by users in the morning hours and another set of content for the particular online contest that is entered by users in the evening hours.

Contest distributor 110 then sends, to social network provider 130, a link message that includes the content formatted according to the associated message template.

3.7 Friend Selection

At block 280, input is received that indicates one or more friends of social user 150 desire to receive an invitation to enter the online contest. Block 280 may involve contest distributor 110 causing a user interface to be displayed that allows social user 150 to identify the one or more friends. After social user 150 agrees to the request for permission, contest distributor 110 has access to information about social user 150, including a list of users that are established as "friends" of social user 150. Thus, block 280 may involve contest distributor 110 accessing that list of friends, causing the user interface to include at least a subset of the list of friends, and receiving input that identifies one or more friends selected by social user 150.

The user interface may allow social user 150 to enter a personal message for the entire group of friends identified (if social user 150 selects more than one friend) or a personal message for each individual friend. In some scenarios, social user 150 may not select the name of any friends whose names are displayed.

In an embodiment where a social network provider is not involved, block 280 is not entered. Alternatively, block 280 is still entered but may instead involve social user 150 submitting contact information of one or more persons known to social user 150. Examples of contact information include email addresses, mailing addresses, and/or phone numbers. Contest distributor 110 uses the contact information to inform the identified persons about the online contest and, optionally, that social user 150 entered the online contest.

At block 290, contest distributor 110 causes a message to be displayed to social user 150. The message may be part of a "Thank You" page that thanks social user 150 for entering the online contest and includes information about, for example, other online contests and/or other products/services provided by contest provider 140.

4.0 Display Sequence

Figure 3A:
FIG. 3A, FIG. 3B, FIG. 3C, FIG. 3D, FIG. 3E, FIG. 3F are diagrams that, collectively, depict an example page flow corresponding to an online contest.
Figure 3B:
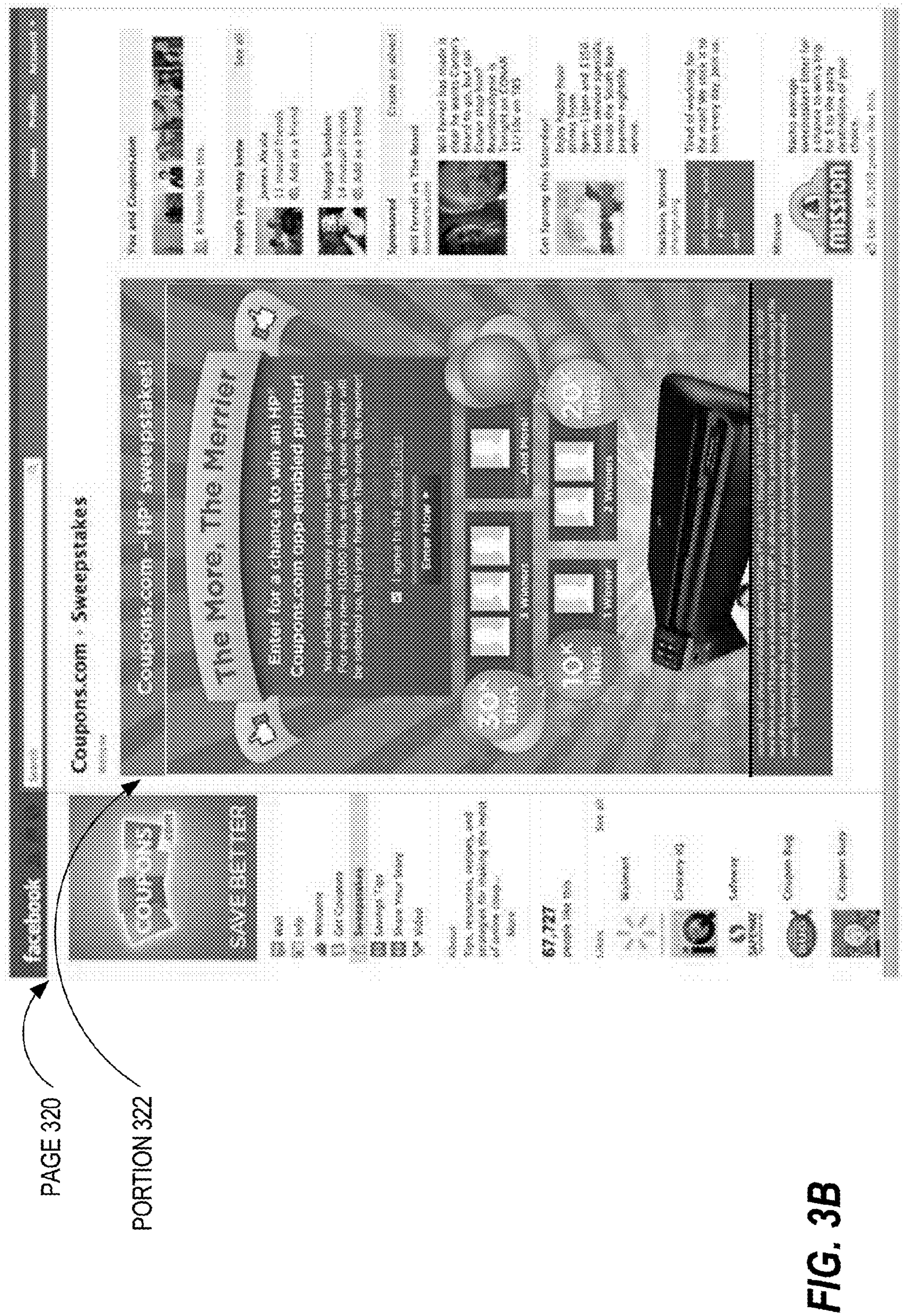
Figure 3C:
Figure 3D:
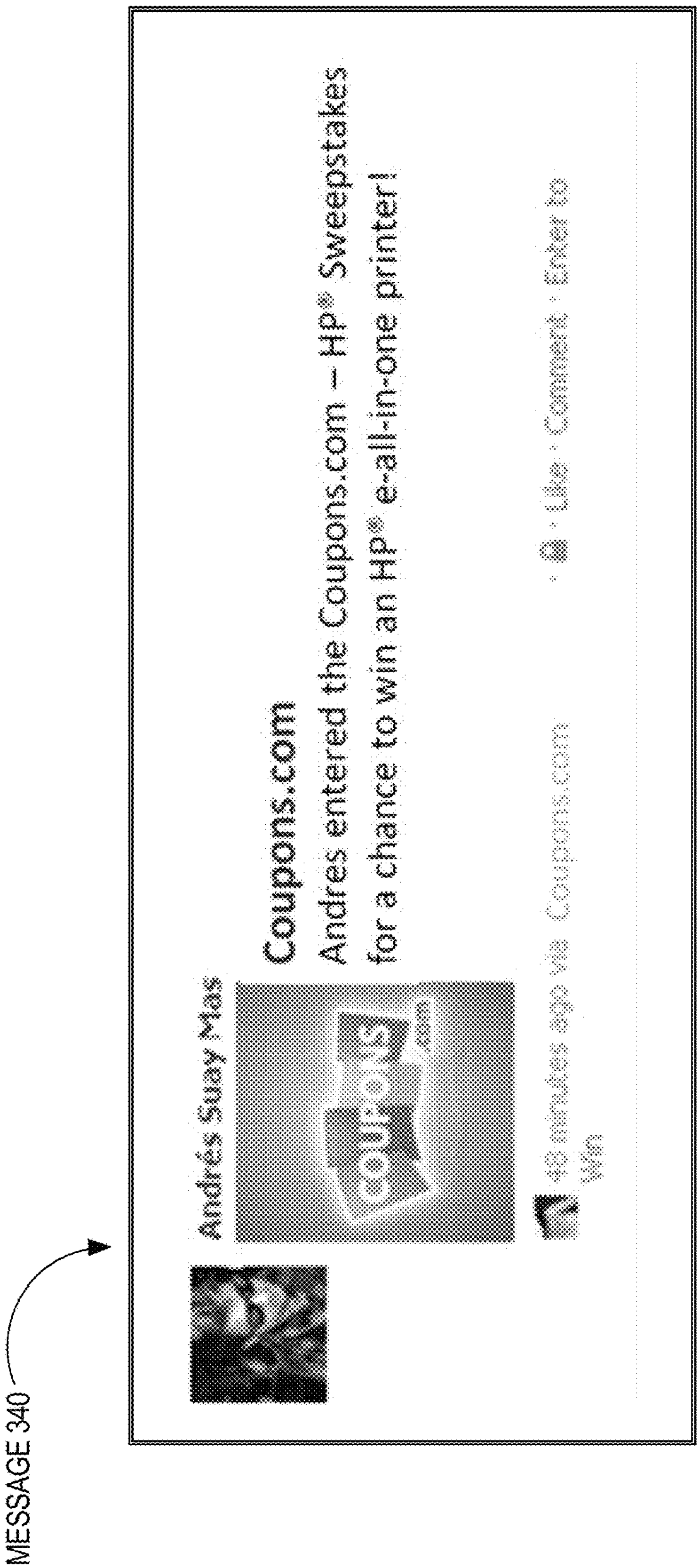
Figure 3E:

FIGS. 3A-3F are diagrams that, collectively, depict an example page flow corresponding to an online contest, according to an embodiment. FIG. 3A depicts a web page 310 that includes a portion 312 whose content is provided by contest distributor 110. The remaining content of page 310 is provided by social network provider 130. As noted previously, although this example involves social network provider 130, other embodiments may not include a social network provider. Also, although the following example involves contest distributor 110 performing certain actions, other embodiments may instead involve contest provider 140 performing those actions.

Portion 312 includes an image and text about an online contest, specifically, a sweepstakes. In this example, the text prompts the user viewing page 310 to "like" the sweepstakes (or the product or brand associated with the online contest) in order to be entered into the sweepstakes. Thus, portion 312 includes a "Like" button, which, when selected, causes web page 320 depicted in FIG. 3B to be displayed.

In an embodiment, in response to detecting that the user selected the "Like" button, contest distributor 110 checks one or more criteria to determine whether to the user is qualified to enter the sweepstakes. Such criteria may include one or more of the checks described previously, namely the like check, the contest check, and the entrance check. If the one or more criteria are satisfied, then contest distributor 110 causes web page 320 (or at least a portion thereof) to be displayed.

Web page 320 includes a portion 322 (provided by contest distributor 110) that includes (a) a link to the rules associated with the sweepstakes, (b) a check box that, when selected, indicates that the user agrees to the rules, and (c) an "Enter Now" button, which, when selected, causes input data to be sent to contest distributor 110. The input data indicates that the "Enter Now" button was selected and indicates whether the user agreed to the rules. If not, then contest distributor 110 may cause another page to be displayed that indicates that the user has not agreed to the rules and, optionally, that the user has not yet been entered in the sweepstakes. If so, then contest distributor 110 causes web page 330 depicted in FIG. 3C to be displayed to the user.

Web page 330 includes a portion 332 (provided by contest distributor 110) that indicates a request for permission from the user. The request in this example indicates that acceptance of the request allows contest distributor 110 to access basic information of the user from social network provider 13 and to send an email to the user's email account. User selection of either the "Allow" button or the "Don't Allow" button causes input data to be sent to content distributor 110. If the input data indicates that the "Don't Allow" button was selected, then contest distributor 110 may cause another page to be displayed that indicates that the user is not entered in the sweepstakes. If the input data indicates that the "Allow" button was selected, then contest distributor 110 causes message 340 depicted in FIG. 3D to be posted to the user's "wall."

The friends of the user that view the user's wall may see message 340, which indicates that the user has entered the sweepstakes. Message 340 also includes a (a) "Like" link that allows the viewer of message 340 to indicate to others viewers of message 340 that the viewer likes the user entering the sweepstakes, (b) a "Comment" link that allows the viewer to provide a comment that will be viewable by other viewers of message 340, and (c) an "Enter to Win" link that allows the viewer of message 340 to enter the sweepstakes. For example, selection of the "Enter to Win" link causes web page 310 (or at least portion 312) to be displayed to the user that selected the link.

In addition to being able to view the user's wall, some friends of the user may each receive a notification, through social network provider 130, of the posting to the user's wall. The notification may contain the same data, including links, in message 340.

In addition to (or alternatively to) causing message 340 to be posted to the user's wall hosted by social network provider 130, contest distributor 110 causes web page 350 to be displayed to the user in response to detecting that the user selected the "Allow" button. Web page 350 includes a portion 352 (provided by contest distributor 110) that allows the user to "select" one or more friends (or rather names or pictures of friends) who will receive an individual message. Such a targeted message is more likely to be viewed by the friend than the notification mechanism described above. Portion 352 includes a user interface that includes names and profile pictures of at least some of the user's friends.

If the user selects the "Skip" button displayed in portion 352 of web page 350, then input data is sent to contest distributor 110. In response to detecting that the user selected the "Skip" button, contest distributor 110 may cause a different page or message to be displayed, such as a "Success" page that indicates that the user successfully entered the sweepstakes.

Figure 3F:

Alternatively, if the user selects one or more friends and then selects the "Send Sweepstakes Invitation" button, then different input data is sent to contest distributor 110. The input data indicates that the "Send Sweepstakes Invitation" button was selected and indicates the one or more selected friends. In response, contest distributor 110 allows the user to preview a sweepstakes invitation message by causing message 360 to be displayed, as depicted in FIG. 3F.

Message 360 indicates at least one selected friend and includes a preview of the content of the sweepstakes invitation message and how it will appear to the selected friend. The sweepstakes invitation message includes an "Accept" button and an "Ignore" button. If the selected friend selects the "Accept" button, then the selected friend may be directed to web page 310, or at least to a page that includes portion 312. Message 360 also includes a link that allows the user to add a personal message that will accompany the sweepstakes invitation message.

Message 360 includes a "Send" button and a "Cancel" button. In response to detecting that the user selects the "Send" button, contest distributor 110 causes the sweepstakes invitation message to be sent to the user. This may involve contest distributor 110 employing an API provided by social network provider 130 to cause the sweepstakes invitation message to be sent to an account (maintained by social network provider 13) of each selected friend. Additionally, contest distributor 110 may cause another web page to be displayed, such as a "Thank You" page that thanks the user for entering the sweepstakes and that indicates that the sweepstakes invitation message was successfully sent. Even if contest distributor 110 detects that the user selected the "Cancel" button instead, contest distributor 110 may still cause a "Thank You" web page to be displayed that at least indicates that the user successfully entered the sweepstakes.

5.0 Creating Content for Online Contests

Figure 4:
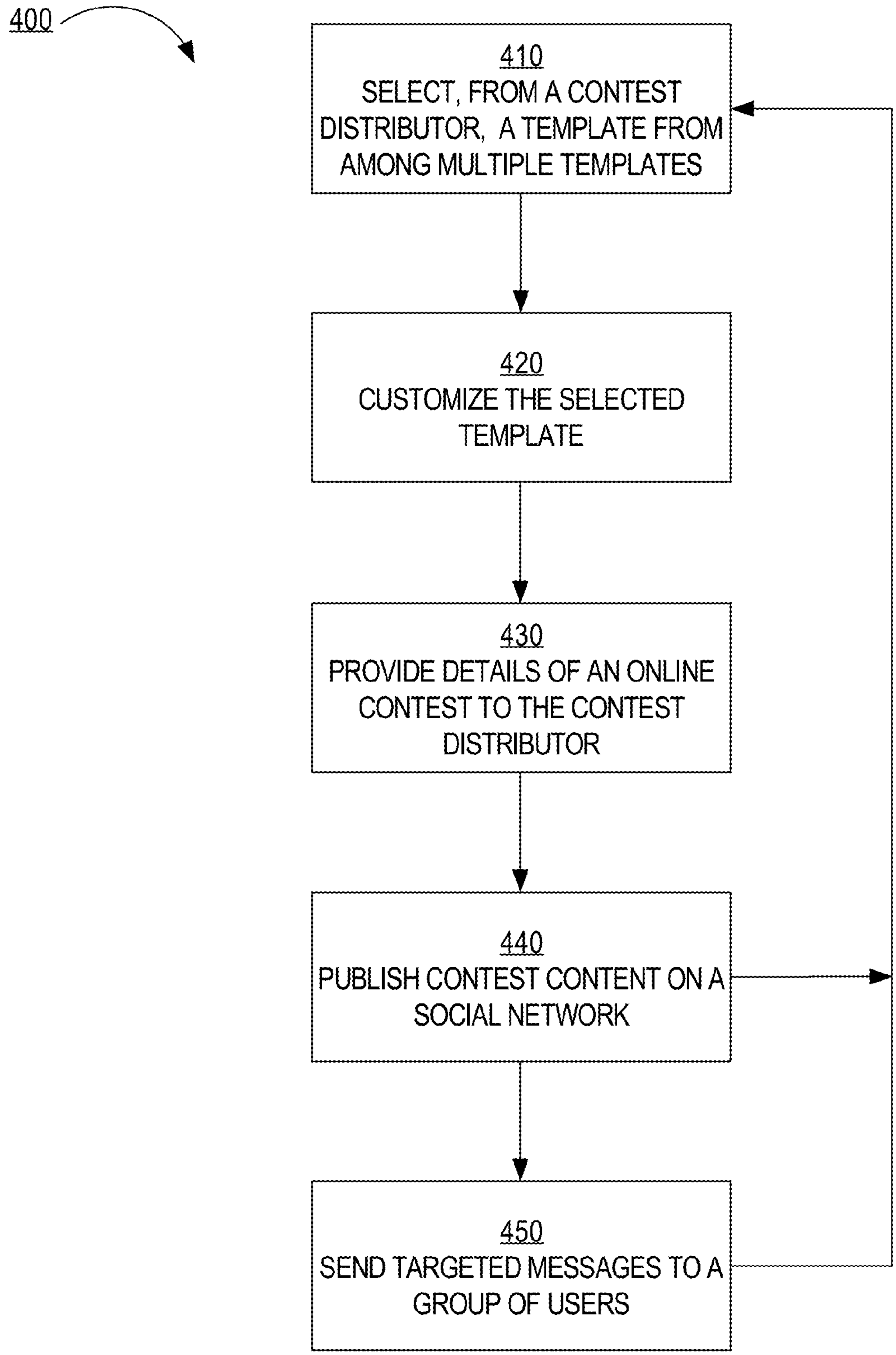
FIG. 4 is a flow diagram that depicts an example process for a contest provider to create content that will be the subject of a page flow.

FIG. 4 is a flow diagram that depicts an example process 400 for a contest provider to create content that will be the subject of a page flow. A page flow is a series of documents, such as web pages or images, that are displayed to a user before and after the user enters an online contest. A page flow may be similar to the page flow depicted in FIGS. 3A-3F.

At block 410, a contest provider selects a template, from a plurality of templates, provided by a contest distributor. For example, contest provider 140 accesses a web service provided by contest distributor 110, where the web service allows contest provider 140 to select a template. Contest distributor 110 stores the plurality of templates in and retrieves the plurality of templates from template database 116 (e.g., that is part of contest distributor 110). Each template dictates how certain data is to be displayed within an electronic document (such as a web page) that is sent to a computing device of an end-user (for example, social user 150) that requests the document. Thus, a template dictates a layout of data, at least some of which is provided by the publisher. The template might also dictate what data is displayed to a potential customer at each stage of a process for entering an online contest, such as a stage prior to a link between the potential contestant and the online contest being created in a social graph, a stage after the link is created, and a stage after the potential contestant has entered the online contest.

At block 420, the contest provider customizes the selected template. One purpose for customizing a template might be to create a visual experience for a social user (for example, social user 150) that is related to the marketing efforts of the contest provider, such as the use of certain colors, logos, graphics, and sounds. The customization may involve the contest provider sending, to the contest distributor, text, one or more images, one or more video clips, and/or one or more audio clips to be stored in association with the selected template. Alternatively, the contest provider might use a tool (provided by the contest distributor or the contest provider) to customize the selected template locally and then send the customized template to the contest distributor. The contest distributor can store the customized template in association with data that identifies the contest provider so that the contest provider may access the customized template later for another online contest provided by the contest provider.

For example, contest provider 140 sends template data to contest distributor 110. Contest distributor 110 might apply the template data to the selected template to create a customized template or the template data might already represent a customized template. In either case, contest distributor 110 stores the customized template in contest database 112 and, optionally, in template database 116. If the customized template is stored in template database 116, contest distributor 110 also stores identification data in association with the customized template to allow contest distributor 110 to present the customized template to contest provider 140 the next time contest provider 140 decides to initiate another online contest.

At block 430, the contest provider provides, to the contest distributor, details of a online contest, such as a title, a summary, one or more digital images, and one or more prizes. The contest distributor stores the details in association with the customized template. In response, the contest distributor provides, to the contest provider, a URL that references the contest distributor.

For example, contest provider 140 sends one or more details of an online contest over network 120 to contest distributor 110. Contest distributor 110 stores the details in contest database 112 and in association with a particular (for example, customized) template. Contest distributor 110 creates a URL and provides the URL to contest provider 140. The URL includes data that is associated with the details of the online contest, which is associated with the particular template. Contest provider 140, which is registered with social network provider 130, sends the URL to social network provider 130 to be stored in association with an account of the contest provider 140.

At block 440, the contest provider causes details of the online contest to be "published" on a social network, such as on a "fan" of home page of the contest provider. The contest provider "publishes" an online contest by configuring its fan page (i.e., hosted by the social network provider) to include the URL provided by the contest distributor. Although publishing implies potential customers viewing published material, the details of the online contest are not viewed by a potential customer until the customer requests the fan page of the contest provider. When the URL is processed by an end user's browser, the URL is sent to the contest distributor, which identifies the appropriate content (i.e., customized template and contest details) and sends that content to the browser to be displayed.

For example, a computing device of social user 150 displays a web page that is hosted by an entity that is different than social network provider 130. The web page includes a link to a "fan" or home page of contest provider 140. Social network provider 130 hosts the home page. By selecting the link, the computing device of social user 150 sends a (for example, HTTP) request, over network 120, to social network provider 130. Social network provider 130 receives the request and identifies an account of contest provider 140. Social network provider 130 sends, to social user 150's computing device, a web data that is processed by a web browser executing on the computing device. The web data includes a URL that was created by contest distributor 110. The web browser identifies the URL and sends, to contest distributor 110, a (for example, HTTP) request that includes the URL. Contest distributor 110 receives the request, uses the URL in the request to identify the appropriate online contest details in contest database 112 and the corresponding template (from template database 116, if the corresponding template is stored separately), and sends, to the computing device of social user 150, document data that is based on the corresponding template and that includes the appropriate details of the online contest. The browser of social user 150 generates, based on the document data, a web page that includes details of the online contest and that is formatted based on the identified template.

In a related embodiment, the fan page hosted by the social network provider is associated with an account of the contest distributor. Such an embodiment may be implemented in at least one of two ways. First, the contest distributor may have a single home or "fan" page that social users may visit. At different times, the fan page provides details about a different online contest. Second, the contest distributor may have multiple pages (hosted by the social network provider) that are accessible to users of the social network provider, where each page is associated with a different contest provider or brand. In either way, the contest provider is not required to register with (or otherwise interact with) the social network provider in order to publish online contests to users of the social network provider. Instead, the contest distributor is required to register with the social network provider and initiate the creation of one or more "fan" pages.

After block 440, process 400 might proceed to block 450 or return to block 410 where the contest provider selects another template for another online contest.

At block 450, the contest provider sends targeted messages to a group of users. In a related embodiment, the contest distributor sends the messages on behalf of the contest provider if the contest distributor has access to and maintains information about users that have chosen to share their respective profile information with the contest provider or contest distributor (described in more detail below).

In an embodiment, the targeted messages are concerned with one or more subsequent online contest. For a particular user that entered a first online contest, a subsequent online contest may be for the same prize of the first online contest, for a different product from the same manufacturer or brand as the first online contest, or for a product from a different manufacturer. In this latter example, the contest distributor may be responsible for sending the targeted messages.

After block 450, process 400 might return to block 410 where the contest provider selects another template for another online contest.

6.0 Selecting a Winner of an Online Contest

In an embodiment where contest distributor 110 distributes an online contest for contest provider 140, contest distributor 110 also receives, from contest provider 140, one or more selection criteria on how to select one or more "winners" from the pool of eligible contestants, i.e., those users that have successfully entered the corresponding online contest and have not violated any of the rules of the online contest.

In an alternative embodiment, even if contest distributor 110 is involved in distributing an online contest for contest provider 140, contest provider 140 uses one or more selection criteria to select one or more contestants who will receive one or more prizes or awards of the online contest.

Some of the one or more selection criteria may require user information that is maintained by social network provider 130. For example, the state of residence or the gender of the contestant may be used to select a winner of an online contest. Thus, in order to apply the one or more selection criteria, contest distributor 110 (or contest provider 140) may first have to retrieve user information from social network provider 130, which may have occurred at the time the users entered the online contest. In an embodiment where contest distributor 110 distributes an online contest for contest provider 140, contest distributor 110 may send, to contest provider 140, contestant information that indicates one or more attributes about each contestant who has successful entered the online contest.

Examples of attributes of a contestant include when (for example date and/or time) the contestant entered the online contest, order data (for example, a number) that indicates when the contestant, relative to other contestants, entered the online contest, age of the contestant, gender of the contestant, and geographical information of the contestant. All or some of the contestant information may have been first retrieved (by contest distributor 110 or contest provider 140) from social network provider 130.

In an embodiment, social user 150 provides a form of currency to contest distributor 110 (or contest provider 140 if contest distributor 110 is not involved) to increase the user's chances of winning the online contest. The currency may be in various forms, such as "hard" currency (for example, dollars or euros) or virtual currency obtained through playing online games or awarded performing other online activity. The hard currency may from a credit card agency (through a credit card), a banking institution (through a debit card), or a third-party merchant (for example, through a gift card).

For example, social network provider 130 may award social user 150 with virtual currency (for example, "Social bucks") when social user 150 performs one or more actions, such as posting to his/her wall a certain number of times, commenting on other social users' posts a certain number of times, and/or recommending social network provider 130 to other users. Instead of or in addition to "liking" an online contest, social user 150 may use his/her virtual currency to enter the online contest and/or increase the chances that social user 150 is a winner of the online contest.

As another example, contest distributor 110 may award social user 150 with virtual currency (for example, "Coupon bucks") for printing out coupons found at a website maintained by contest distributor 110 and/or for redeeming such coupons. With such virtual currency, social user 150 can direct contest distributor 110 to use that currency to either enter an online contest managed by contest distributor 110 and/or to increase the chances that social user 150 is a winner of the online contest.

7.0 Distributor Using User Data to Distribute Online Contests

In an embodiment, once a user of a social network agrees to share private information of the user with a contest distributor, the contest distributor can use that information to send targeted messages to that user. The messages may be email messages, text messages, or messages that are sent by a protocol established by the social network provider with which the user is registered.

Contest distributor 110 stores information about multiple social users in user database 114. Such information is referred to herein as "user profile data." As described previously, user profile data might indicate, for each user, gender, age, interests, email address, residence information, educational history, occupational history, social network user ID, or any other data customarily used to describe a user. Once contest distributor 110 has details regarding multiple users of social network provider 130, contest distributor 110 can send, to those users via social network, messages about subsequent online contests or other promotions to those users.

In an embodiment, contest distributor 110 uses the user profile data to identify a group of users to which targeted messages will be sent. For example, if a set of users each entered an online contest provided by contest provider 140, then contest distributor 110 might send, to each user in the set, a message that includes information about another online contest that is also provided by contest provider 140. As another example, contest distributor 110 might identify a set of users that each entered an online contest for a certain type of prize and send, to each user in that set, a message about another online contest for a different, but related prize.

In these two examples, the specific prizes or online contests entered by users are used to identify a group of users to send a particular message. Additionally or alternatively, a group of users might be identified based on information about the users themselves. For example, all male users over the age of 50 are sent a message that includes information about an online contest for a hair loss product. As another example, all users that have expressed an interest in golf are sent a message about an online contest to win golf equipment from a particular retailer. As another example, all users that have "Liked" a certain artist are sent a message about an online contest for tickets to a concert in which that artist will perform.

Thus, regardless of which online contest first influenced various users to share their private information with contest distributor 110, many contest providers and other product/service promoting entities might contract with the contest distributor 110 to send targeted messages to users.

8.0 Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
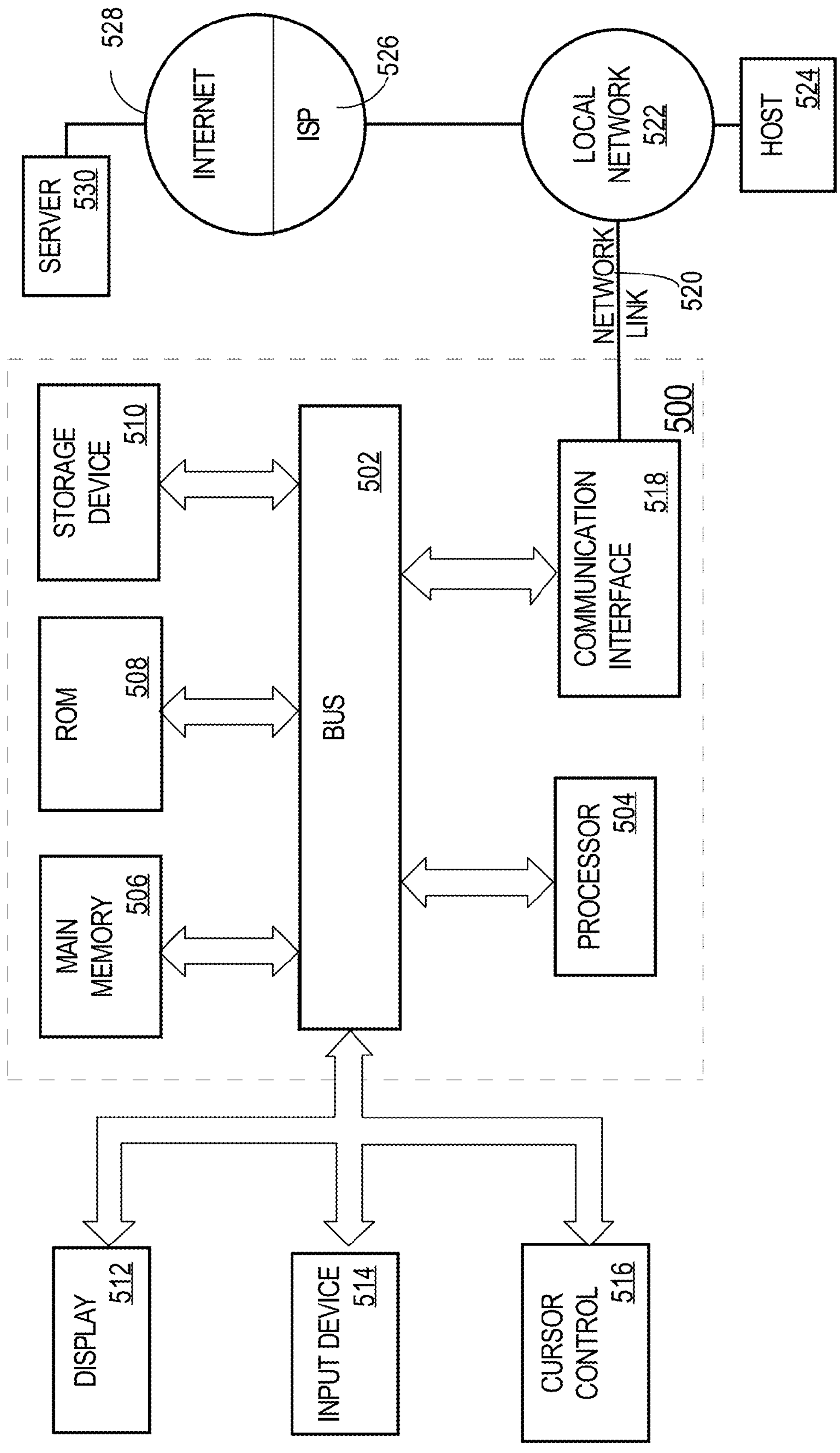
FIG. 5 illustrates a computer system upon which embodiments of the invention may be implemented.

For example, FIG. 5 is a block diagram that illustrates a computer system 500. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (for example, x) and a second axis (for example, y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process blocks described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 may transmit a requested code for an application program through Internet 528, ISP 526, local network 522 and communication interface 518. The received code may be executed by processor 504 as it is received, and/or stored in storage device 510, or other non-volatile storage for later execution.

9.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

receiving, at one or more server computers of a contest distributor, contest data for a first online contest, wherein the contest data includes a plurality of message templates for the first online contest, wherein each of the plurality of message templates specifies what type of information will be in a message or how the message will be formatted;

causing, to be displayed on a client device to a first user, on a first web page of a first online social network of a first social network provider, first contest data that indicates that the first online contest is in a locked state and an indication of a second web page of the contest distributor;

receiving, at the contest distributor and responsive to the first user interacting with the second web page of the contest distributor, first input that indicates an intention by the first user to participate in the first online contest;

determining that the first user has not already indicated an intention to participate in the first online contest;

determining that one or more attributes of the first online contest satisfy certain criteria;

determining that the first user has not reached a limit of a number of times the first user has entered the first online contest;

sending, from the contest distributor, first request data that indicates a first request, by the contest distributor, for one or more permissions allowing the contest distributor to access, from the first social network provider, information about the first user;

after sending the first request data, receiving, over a computer network and at the one or more server computers of the contest distributor, first acceptance data that indicates that the first user accepts the first request;

in response to receiving the first acceptance data, the one or more server computers of the contest distributor performing:

causing the first user to be entered in the first online contest only after determining that the first user has not already indicated an intention to participate in the first online contest, that one or more attributes of the first online contest satisfy certain criteria, and that the first user has not reached a limit of a number of times the first user has entered the first online contest;

selecting, based on one or more criteria, a first template from the plurality of message templates;

generating, based on the first template, a first message that includes data about the first online contest or a contest provider that initiated the first online contest; and causing the first message to be sent over the first online social network to a first plurality of users that are connected to the first user in the first online social network;

receiving, over the computer network and at the one or more server computers of the contest distributor, second acceptance data that indicates that a second user accepts a second request, by the contest distributor, for one or more permissions allowing the contest distributor to access, from the first social network provider, information about the second user;

in response to receiving the second acceptance data, the one or more server computers of the contest distributor performing:

causing the second user to be entered in the first online contest;

selecting, based on the one or more criteria, a second template from the plurality of message templates, wherein the first template and the second template are different;

generating, based on the second template, a second message that includes data about the first online contest or the contest provider that initiated the first online contest; and causing the second message to be sent over the first online social network to a second plurality of users that are connected to the second user in the first online social network;

wherein the method is performed by one or more computing devices.

2. The method of claim 1, further comprising, after receiving the first acceptance data:

sending, to the first social network provider, a request for information about the first user;

in response to the request, receiving, from the first social network provider, profile information about the first user; and sending a subset of the profile information to the contest provider that provides the first online contest and that is different than the contest distributor.

3. The method of claim 1, further comprising, after receiving the first acceptance data, causing a user node that is associated with the first user to be linked, within the first online social network, with a contest node that is associated with the first online contest.

4. The method of claim 1, further comprising, prior to causing the first user to be entered in the first online contest:

determining whether the first user has already entered the first online contest;

wherein causing the first user to be entered in the first online contest is performed only after determining that the first user has not already entered the first online contest.

5. The method of claim 1, further comprising, prior to causing the first user to be entered in the first online contest:

determining whether the first user has accepted one or more rules of the first online contest;

wherein causing the first user to be entered in the first online contest is performed only after determining that the first user has accepted the one or more rules of the first online contest.

6. The method of claim 1, wherein selecting the first template comprises selecting the first template based on the one or more criteria, wherein the one or more criteria include at least one of: a time of day, a past amount of online contest participation of the first user, a behavior of the first user, an attribute of the first input, or an attribute of the first acceptance data.

7. The method of claim 1, wherein causing the first message to be sent comprises:

sending, to the first social network provider, a link message that is formatted according to the first template.

8. The method of claim 1, further comprising:

identifying a plurality of users that includes the first user and the second user, as contestants of the first online contest;

receiving, from the first social network provider, information about the plurality of users that includes: said information about the first user, and said information about the second user;

after identifying the plurality of users and receiving the information about the plurality of users from the first social network provider, determining, based on one or more selection criteria of the first online contest and the information about the plurality of users received from the first social network provider, which users are winners of the first online contest.

9. The method of claim 1, further comprising:

causing, to be displayed to a third user through a web page of a second social network provider that is different than the first social network provider and that provides a second social network that is different than the first online social network, second contest data that indicates a second online contest;

receiving, at the contest distributor, second input that indicates an intention by the third user to participate in the second online contest;

sending, from the contest distributor, third request data that indicates a third request, by the contest distributor, for one or more second permissions that allows the contest distributor to access information from the second social network provider about the third user;

after sending the third request data, receiving, at the contest distributor, third acceptance data that indicates that the third user accepts the second request;

in response to receiving the third acceptance data, causing the third user to be entered in the second online contest.

10. The method of claim 1, further comprising:

causing, to be displayed to a third user through a web page of a second social network provider that provides a second social network, second contest data that indicates a second online contest that is different than the first online contest;

receiving, at the contest distributor, second input that indicates an intention by the third user to participate in the second online contest;

sending, from the contest distributor, third request data that indicates a second request, by the contest distributor, for one or more second permissions that allows the contest distributor to access information from the second social network provider about the third user;

after sending the third request data, receiving, at the contest distributor, third acceptance data that indicates that the third user accepts the second request;

in response to receiving the third acceptance data, causing the third user to be entered in the second online contest.

11. The method of claim 1, further comprising:

causing, to be displayed to the first user through a second web page of the first social network provider, second contest data that indicates a second online contest that is different than the first online contest;

receiving, at the contest distributor, second input that indicates an intention by the first user to participate in the second online contest;

after receiving the second input, causing the first user to be entered in the second online contest without requiring the first user to accept a request to allow the contest distributor to access information from the first social network provider about the first user.

12. One or more computer-readable non-transitory storage media storing instructions which, when executed by one or more processors, cause:

receiving, at one or more server computers of a contest distributor contest data for a first online contest, wherein the contest data includes a plurality of message templates for the first online contest, wherein each of the plurality of message templates specifies what type of information will be in a message or how the message will be formatted;

causing, to be displayed on a client device to a first user, on a first web page of a first online social network of a first social network provider, first contest data that indicates that the first online contest is in a locked state and an indication of a second web page of the contest distributor;

receiving, at the contest distributor and responsive to the first user interacting with the second web page of the contest distributor, first input that indicates an intention by the first user to participate in the first online contest;

determining that the first user has not already indicated an intention to participate in the first online contest;

determining that one or more attributes of the first online contest satisfy certain criteria;

determining that the first user has not reached a limit of a number of times the first user has entered the first online contest;

sending, from the contest distributor, first request data that indicates a first request, by the contest distributor, for one or more permissions allowing the contest distributor to access information from the first social network provider about the first user;

after sending the first request data, receiving, over a computer network and at the one or more server computers of the contest distributor, first acceptance data that indicates that the first user accepts the first request;

in response to receiving the first acceptance data, one or more server computers of the contest distributor performing:

causing the first user to be entered in the first online contest only after determining that the first user has not already indicated an intention to participate in the first online contest, that one or more attributes of the first online contest satisfy certain criteria, and that the first user has not reached a limit of a number of times the first user has entered the first online contest;

selecting, based on one or more criteria, a first template from the plurality of message templates;

generating, based on the first template, a first message that includes data about the first online contest or a contest provider that initiated the first online contest; and causing the first message to be sent over the first online social network to a first plurality of users that are connected to the first user in the first online social network;

receiving, over the computer network and at the one or more server computers of the contest distributor, second acceptance data that indicates that a second user accepts a second request, by the contest distributor, for one or more permissions allowing the contest distributor to access information from the first social network provider about the second user;

in response to receiving the second acceptance data, the one or more server computers of the contest distributor performing:

causing the second user to be entered in the first online contest;

selecting, based on the one or more criteria, a second template from the plurality of message templates, wherein the first template and the second template are different;

generating, based on the second template, a second message that includes data about the first online contest or the contest provider that initiated the first online contest; and causing the second message to be sent over the first online social network to a second plurality of users that are connected to the second user in the first online social network.

13. The one or more computer-readable non-transitory storage claim 12, wherein the instructions, when executed by the one or more processors, further cause, after receiving the first acceptance data:

sending, to the first social network provider, a request for information about the first user;

after sending the request, receiving, from the first social network provider, profile information about the first user; and after receiving the profile information about the first user, sending a subset of the information to a first contest provider that provides the first online contest and that is different than the contest distributor.

14. The one or more computer-readable non-transitory storage claim 12, wherein the instructions, when executed by the one or more processors, further cause, after receiving the first acceptance data, causing a user node that is associated with the first user to be linked, within the first online social network, with a contest node that is associated with the first online contest.

15. The one or more computer-readable non-transitory storage media of claim 12, wherein the instructions, when executed by the one or more processors, further cause, prior to causing the first user to be entered in the first online contest:

determining whether the first user has already entered the first online contest;

wherein causing the first user to be entered in the first online contest is performed only after determining that the first user has not already entered the first online contest.

16. The one or more computer-readable non-transitory storage media of claim 12, wherein the instructions, when executed by the one or more processors, further cause, prior to causing the first user to be entered in the first online contest:

determining whether the first user has accepted one or more rules of the first online contest;

wherein causing the first user to be entered in the first online contest is performed only after determining that the first user has accepted the one or more rules of the first online contest.

17. The one or more computer-readable non-transitory storage media of claim 12, wherein selecting the first template comprises selecting the first template based on the one or more criteria, wherein the one or more criteria includes at least one of: a time of day, a past amount of online contest participation of the first user, a behavior of the first user, an attribute of the first input, or an attribute of the first acceptance data.

18. The one or more computer-readable non-transitory storage media of claim 12, wherein causing the first message to be sent comprises:

sending, to the first social network provider, a link message that is formatted according to the first template.

19. The one or more computer-readable non-transitory storage media of claim 12, wherein the instructions, when executed by the one or more processors, further cause:

identifying a plurality of users, that includes the first user and the second user, as contestants of the first online contest;

receiving, from the first social network provider, information about the plurality of users that includes: said information about the first user, and said information about the second user;

after identifying the plurality of users and receiving the information about the plurality of users from the first social network provider, determining, based on one or more selection criteria of the first online contest and the information, about the plurality of users, received from the first social network provider, which users are winners of the first online contest.

20. The one or more computer-readable non-transitory storage media of claim 12, wherein the instructions, when executed by the one or more processors, further cause:

causing, to be displayed to a third user through a web page of a second social network provider that is different than the first social network provider and that provides a second social network that is different than the first online social network, second contest data that indicates a second online contest;

receiving, at the contest distributor, second input that indicates an intention by the third user to participate in the second online contest;

sending, from the contest distributor, third request data that indicates a third request, by the contest distributor, for one or more second permissions that allows the contest distributor to access information from the second social network provider about the third user;

after sending the third request data, receiving, at the contest distributor, third acceptance data that indicates that the third user accepts the second request;

in response to receiving the third acceptance data, causing the third user to be entered in the second online contest.

21. The one or more computer-readable non-transitory storage media of claim 12, wherein the instructions, when executed by the one or more processors, further cause:

causing, to be displayed to a third user through a web page of a second social network provider that provides a second social network, second contest data that indicates a second online contest that is different than the first online contest;

receiving, at the contest distributor, second input that indicates an intention by the third user to participate in the second online contest;

sending, from the contest distributor, third request data that indicates a second request, by the contest distributor, for one or more second permissions that allows the contest distributor to access information from the second social network provider about the third user;

after sending the third request data, receiving, at the contest distributor, third acceptance data that indicates that the third user accepts the second request;

in response to receiving the third acceptance data, causing the third user to be entered in the second online contest.

22. The one or more computer-readable non-transitory storage media of claim 12, wherein the instructions, when executed by the one or more processors, further cause:

causing, to be displayed to the first user through a second web page of the first social network provider, second contest data that indicates a second online contest that is different than the first online contest;

receiving, at the contest distributor, second input that indicates an intention by the first user to participate in the second online contest;

after receiving the second input, causing the first user to be entered in the second online contest without requiring the first user to accept a request to allow the contest distributor to access information from the first social network provider about the first user.

* * * * *